US005229084A

United States Patent [19]

Livingston et al.

[11] Patent Number: 5,229,084

[45] Date of Patent: Jul. 20, 1993

[54] DISPENSER CAP WITH DISTRIBUTOR FOR NON-LIQUID CHEMICAL DELIVERY SYSTEMS

[75] Inventors: James W. Livingston; Frederick J. Fulmer, both of Santa Cruz, Calif.

[73] Assignee: Beta Technology, Inc., Santa Cruz, Calif.

[21] Appl. No.: 860,770

[22] Filed: Mar. 25, 1992

[51] Int. Cl.$^5$ .............................................. B01D 11/02

[52] U.S. Cl. .................................... 422/278; 422/264; 422/266; 422/267; 422/274; 222/189

[58] Field of Search ............... 422/264, 266, 274, 267, 422/277, 278; 222/189, 570, 651; 220/370, 372; 141/67, 70, 370, 372, 368; 239/120-122, 134, 507, 520, 524

[56] References Cited

U.S. PATENT DOCUMENTS

| | | | |
|---|---|---|---|
| Re. 17,407 | 8/1929 | Lane | 239/122 |
| 1,175,870 | 3/1916 | Iscra | 239/122 |
| 2,723,905 | 11/1952 | Coakley | 422/278 |
| 3,333,773 | 8/1967 | Hutchinson | 239/524 |
| 4,571,327 | 2/1986 | Larson et al. | 422/264 |
| 4,576,219 | 3/1986 | Uram | 222/189 |
| 4,666,682 | 5/1987 | Mayer et al. | 422/274 |
| 4,690,305 | 9/1987 | Copeland | 222/189 |
| 4,790,981 | 12/1988 | Mayer et al. | 222/189 |
| 5,007,559 | 4/1991 | Young | 222/1 |

FOREIGN PATENT DOCUMENTS 300819 1/1989 European Pat. Off. .

*Primary Examiner*—Robert J. Warden
*Assistant Examiner*—Hien Tran
*Attorney, Agent, or Firm*—Flehr, Hohbach, Test, Albritton & Herbert

[57] ABSTRACT

A dispenser cap for a non-liquid chemical delivery system is disclosed. The dispenser cap is attached to the base of a chemical container holding a non-liquid chemical. The dispenser cap is also coupled to a discharge conduit which includes a nozzle positioned within it. The nozzle may produce a direct vertical spray and a circumferential spray into the dispenser cap. The dispenser cap disclosed includes a distributor for intercepting the direct vertical spray of water into the dispenser cap. The distributor indirectly conveys the intercepted water into the container. The water conveyed into the container by the distributor produces a stream of chemicals which exits the container through the discharge conduit, without impinging upon the nozzle.

9 Claims, 3 Drawing Sheets

DISPENSER CAP WITH DISTRIBUTOR FOR NON-LIQUID CHEMICAL DELIVERY SYSTEMS

BRIEF DESCRIPTION OF THE INVENTION

The present invention relates to a dispenser cap used in a chemical delivery system. More particularly, the present invention relates to a dispenser cap with a distributor which facilitates the efficient operation of a non-liquid chemical delivery system.

BACKGROUND OF THE INVENTION

Non-liquid chemical delivery systems are used in a variety of processes including dish washing and clothes washing. Generally, a non-liquid chemical delivery system includes a container for holding a non-liquid chemical such as a detergent. The non-liquid chemical may be in powder, granular, pellet, or cartridge form.

Generally, a dispenser cap is positioned beneath the container. Prior art dispenser caps include a mesh. When dry, the non-liquid chemical rests on the mesh and will not flow through it under its own weight.

A nozzle is positioned beneath the dispenser cap. The nozzle forces water through the mesh of the dispenser cap and into the container. The passage of water through the mesh entrains the non-liquid chemical and the resulting mixture is transported through the mesh into a discharge conduit which leads to a dish washer, a clothes washer, or another system.

The nozzle sprays water in a generally vertical direction into the container. The nozzle is typically controlled by a valve which is coupled to an electrical circuit. When the concentration of the dissolved chemical falls below a specified amount, the valve opens and water is sprayed into the container. When the concentration reaches a sufficiently high level, the valve closes and spraying is stopped.

With the conventional vertical nozzle system described, the depth of the wetted chemical is relatively great. When the chemical delivery system is not in use, the wetted non-liquid chemicals tend to solidify. Thereafter, it is difficult to dissolve them in a controlled manner. Thus, it is desirable to reduce wetting in a non-liquid chemical container.

Another problem with conventional non-liquid chemical delivery systems is that the discharged chemical tends to drip into the nozzle, eventually causing an obstruction of the nozzle. This problem is especially acute in hard water areas.

Still another problem with conventional non-liquid chemical delivery systems arises through the use of sodium hydroxide in many non-liquid chemicals used in dish washing processes. When the nozzle injects hot water into a container including sodium hydroxide, steam is generated. The moisture of the steam migrates into the container causing wetting and subsequent hardening of the chemical.

OBJECTS AND SUMMARY OF THE INVENTION

It is a general object of the present invention to provide an improved dispenser cap to be used in conjunction with a chemical delivery system.

It is a more particular object of the present invention to provide a dispenser cap with a distributor which may be used in accordance with a non-liquid chemical delivery system.

It is another object of the present invention to provide a dispenser cap which reduces wetting and subsequent hardening of a non-liquid chemical.

It is still another object of the present invention to provide a dispenser cap which reduces the obstruction of the nozzle typically produced by a chemical discharged from a chemical delivery system.

It is yet another object of the present invention to provide a dispenser which reduces the caustic byproduct produced by wetted non-liquid chemicals.

These and other objects are achieved by a dispenser cap with a distributor for use in a non-liquid chemical delivery system. The dispenser cap is attached to the base of a chemical container holding a non-liquid chemical. The dispenser cap is also coupled to a discharge conduit which includes a nozzle positioned within it. The nozzle may produce a direct vertical spray and a circumferential spray into the dispenser cap. The dispenser cap disclosed includes a distributor for intercepting the direct vertical spray of water into the dispenser cap. The distributor indirectly conveys the intercepted water into the container. The water conveyed into the container by the distributor produces a stream of chemicals which exits the container through the discharge conduit, without impinging upon the nozzle.

BRIEF DESCRIPTION OF THE DRAWINGS

For a better understanding of the nature and objects of the invention, reference should be had to the following detailed description taken in conjunction with the accompanying drawings in which.

Like reference numerals refer to corresponding parts throughout the several views of the drawings.

DETAILED DESCRIPTION OF THE INVENTION

Figure 1:
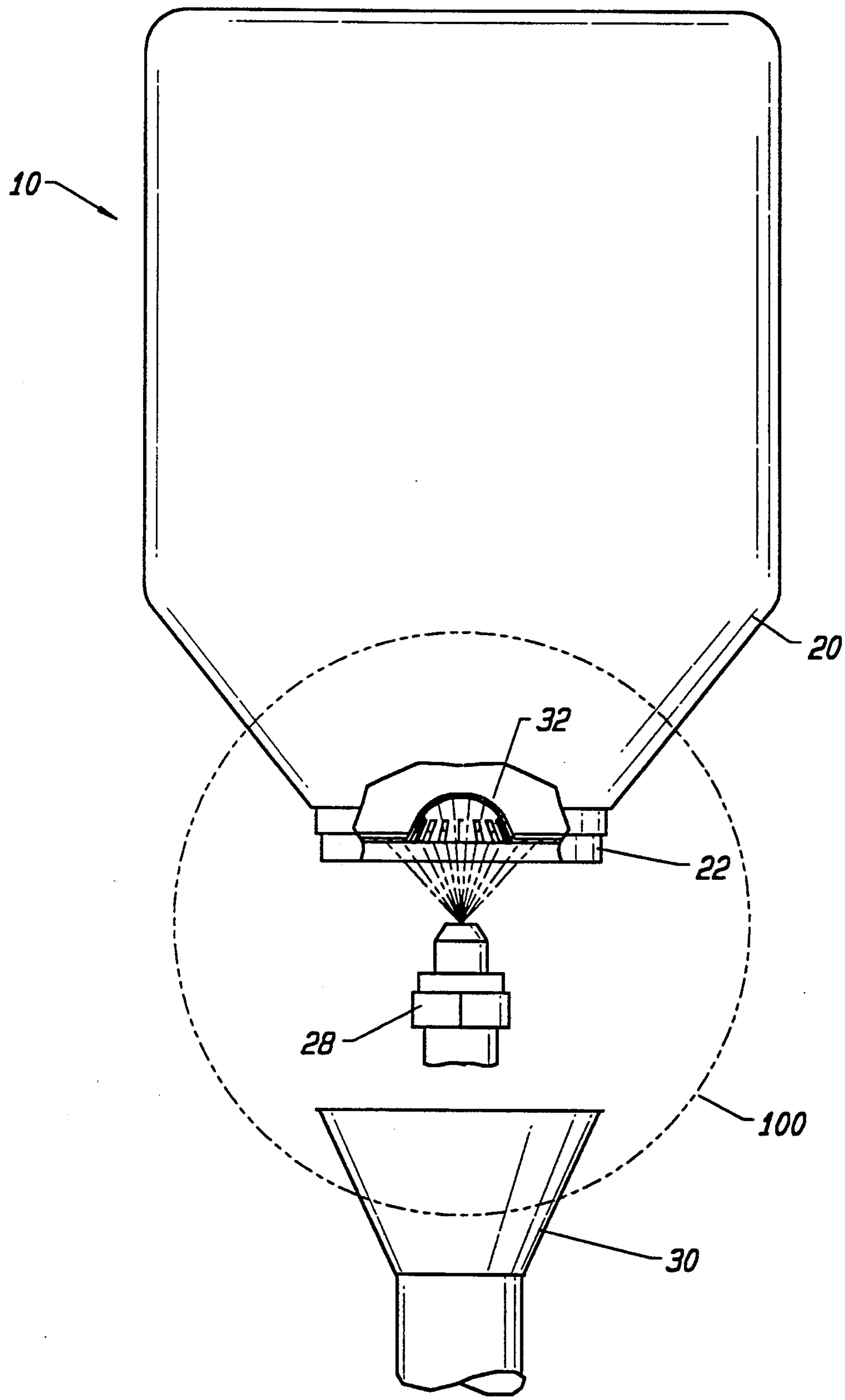
FIG. 1 is a cross-sectional view of a non-liquid chemical delivery system which may be used in accordance with the present invention.

Referring to FIG. 1, a non-liquid chemical delivery system 10 is disclosed. The non-liquid chemical delivery system is of the type commonly used in dish washing and clothes washing processes. The system 10 includes a container 20 which may hold a non-liquid chemical in powder, granular, pellet, or cartridge form.

Figure 2:
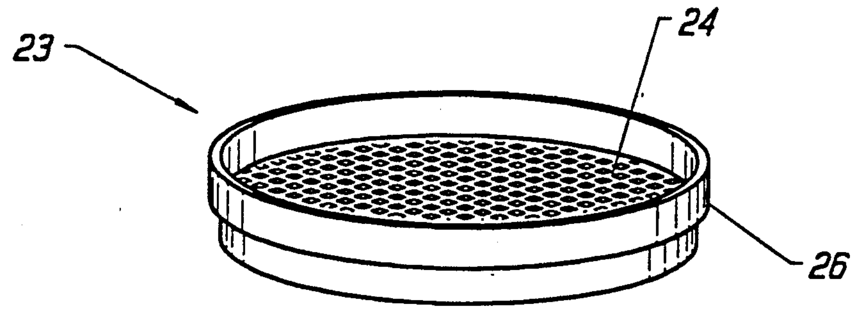
FIG. 2 (PRIOR ART)
FIG. 2 is a perspective view of a prior art dispenser cap.

A dispenser cap 22 is positioned beneath the container. A prior art dispenser cap 23 is disclosed in relation to FIG. 2. The prior art dispenser cap 23 includes a mesh substrate 24. When dry, the non-liquid chemical rests on the mesh 24 and will not flow through it under its own weight. The dispenser cap 23 also includes a lip 26 which is utilized in coupling the dispenser cap to the container 20.

Returning to FIG. 1, a nozzle 28 is positioned beneath dispenser cap 22. The nozzle 28 forces water through the mesh 24 of the dispenser cap 22 and into the container 20. The passage of water through the mesh 24 entrains the non-liquid chemical and the resulting mixture is transported through the mesh 24 into a discharge conduit 30 which leads to a dish washer, a clothes washer, or another appropriate system.

Figure 3:
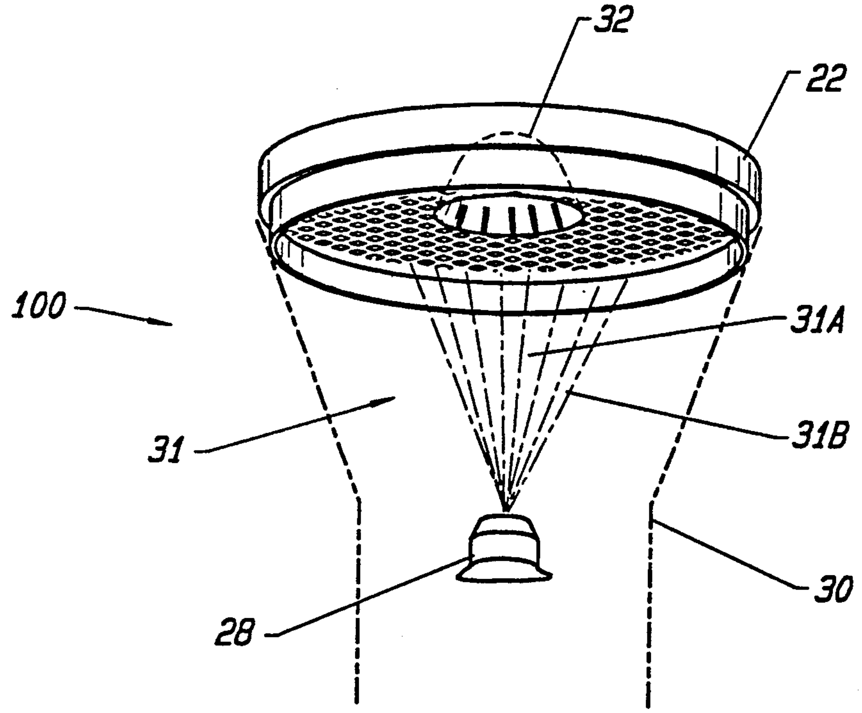
FIG. 3 is an enlarged perspective view of a portion of FIG. 1.

FIG. 3 is an enlarged perspective view of the round region 100 in FIG. 1. FIG. 3 depicts that the nozzle 28 sprays water into the container in a cone shaped spray pattern 31. Generally, the spray pattern 31 from the nozzle 28 includes a direct vertical portion 31A and a circumferential portion 31B.

The nozzle 28 is typically controlled by a valve (not shown) which is coupled to an electrical circuit (not shown). In accordance with prior art techniques, when the concentration of a given chemical at a destination of the conduit such as a clothes washer falls below a specified amount, the valve opens and water is sprayed into the container. When the concentration reaches a sufficiently high level, the valve closes and spraying is stopped.

A problem with the nozzle system described is that the nozzle forces water deep into the container 20; particularly, the direct vertical spray 31A from the nozzle is forced deep into the container 20. When the chemical delivery system 10 is not in use, the wetted non-liquid chemicals tend to solidify. Thereafter, it is difficult to dissolve them in a controlled manner.

Another problem with the non-liquid chemical delivery system 10 is that the discharged chemical tends to drip down onto the nozzle 28, eventually causing an obstruction of the nozzle 28. This problem is especially acute in hard water areas.

Still another problem with the non-liquid chemical delivery system 10 arises through the use of sodium hydroxide in many non-liquid chemicals used in dish washing processes. When the nozzle 28 injects hot water into a container 20 which includes sodium hydroxide, steam is generated. The moisture of the steam migrates into the container 20 causing wetting and subsequent hardening of the chemical.

Figure 4:
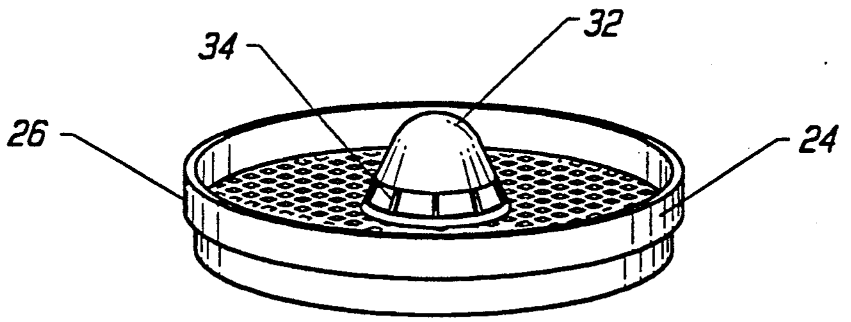
FIG. 4 is a perspective view of a dispenser cap in accordance with the present invention.

These problems are largely eliminated with the present invention. Turning to FIG. 4, a dispenser cap 22 of the present invention is disclosed. The dispenser 22 includes a mesh substrate 24 and a lip 26 for coupling to container 20. The dispenser cap 22 of the present invention also includes a distributor 32. In the preferable embodiments, distributor 32 is a solid dome-like structure supported by risers 34.

Generally, the distributor is positioned on the mesh substrate 22 so that it is in axial alignment with the nozzle 28. In this way, the distributor intercepts the direct vertical spray 31A of water from the nozzle 28. The direct vertical spray 31A from the nozzle 28 impinges upon the distributor 32 and is deflected by it. Some of the deflected water migrates between the risers 34 into the container 20. Some of the deflected water falls on the nozzle 28, helping to keep the nozzle clean and unobstructed. The circumferential spray 31B from the nozzle travels directly through the mesh 24 into container 20.

Thus, the distributor 32 prevents the direct injection of water from the nozzle 28 into the container 20. That is, the distributor intercepts the direct vertical spray 31A of water into the container 20. Consequently, wetting of the chemical within the container 20 is reduced. This reduces subsequent hardening of the chemical and its associated problems.

Another benefit associated with the present invention is that the distributor 32 directs the outgoing chemical stream from the container 20 along the periphery of the discharge conduit 30. In other words, since the nozzle 28 and the distributor 32 are in axial alignment, the distributor 32 prevents the outgoing chemical stream from falling directly into the nozzle 28. As a result, the nozzle 28 does not become obstructed. Moreover, some of the clean water deflected by the distributor 32 falls back onto the nozzle 28 to keep it clean.

Figure 5:
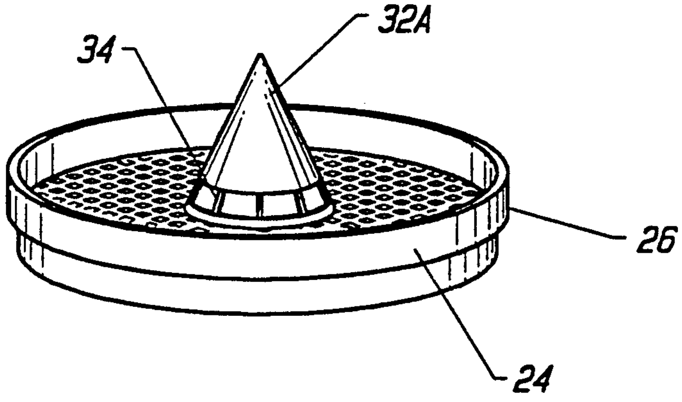
FIG. 5 is a perspective view of an alternate embodiment of the dispenser cap of the present invention.
Figure 6:
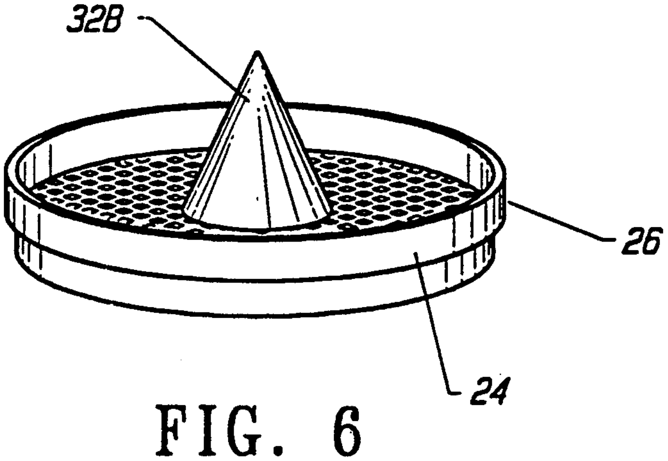
FIG. 6 is a perspective view of an alternate embodiment of the dispenser cap of the present invention.

A second embodiment of the present invention is disclosed in relation to FIG. 5. The distributor 32A in this embodiment is in the shape of a cone. The direct vertical spray from the nozzle 28 impinges upon the distributor 32A and is deflected between the risers 34 or falls back on to the nozzle 28. The water which goes between the risers 34 helps to flush chemical sitting on the mesh substrate. Another embodiment of the present invention is disclosed in reference to FIG. 6. This embodiment includes a cone-like distributor 32B, but does not include risers 34. Without the risers, less direct vertical spray 31A from the nozzle 28 is conveyed into the container.

The dispenser cap 22 of the present invention may be formed of plastic through injection molding techniques known in the art. The dimensions of the cap are contingent upon the size of the container 20. The dimensions of the mesh substrate 24 is contingent upon the chemical within the container 20. One skilled in the art will recognize that the configuration of the distributor 32 may assume any of a number of shapes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A non-liquid chemical delivery system comprising:
- a container holding a non-liquid chemical, said container including a top and a bottom;
- a mesh substrate including a center and a perimeter formed around said center;
- a lip positioned on the perimeter of said mesh substrate for coupling said mesh substrate to said bottom of said container; and
- a dome shaped distributor with an interior surface and an exterior surface, said dome shaped distributor being positioned on risers at the center of said mesh substrate so as to protrude into said container with said exterior surface facing said non-liquid chemical within said container, said dome shaped distributor creating a multi-directional flow of water when water is impinged thereon by a nozzle positioned beneath said dome shaped distributor such that a portion of said water migrates along said interior surface, between said risers, and into said container, while a portion of said water is deflected back into said nozzle so as to clean said nozzle.

2. The non-liquid chemical delivery system of claim 1, said mesh substrate, lip, dome shaped distributor and risers comprising a single molded piece of plastic.

3. A non-liquid chemical delivery system comprising:

a container holding a non-liquid chemical, said container including a top and a bottom;

a mesh substrate including a center and a perimeter formed around said center;

a lip positioned on the perimeter of said mesh substrate for coupling said mesh substrate to said bottom of said container; and a cone shaped distributor with an interior surface and an exterior surface, said cone shaped distributor being positioned on risers at the center of said mesh substrate so as to protrude into said container with said exterior surface facing said non-liquid chemical within said container, said cone shaped distributor creating a multi-directional flow of water when water is impinged thereon by a nozzle positioned beneath said cone shaped distributor such that a portion of said water migrates along said interior surface, between said risers, and into said container, while a portion of said water is deflected back into said nozzle so as to clean said nozzle.

4. The non-liquid chemical delivery system of claim 3, said mesh substrate, lip, dome shaped distributor and risers comprising a single molded piece of plastic.

5. A non-liquid chemical delivery system comprising:

a container holding a non-liquid chemical, said container having a top and a bottom, including an orifice at the bottom of said container, said orifice including a center; and a dispenser cap coupled to the bottom of said container, said dispenser cap including a mesh substrate covering all of said container's bottom orifice and forming an aperture perimeter defining an aperture region located at said center of said bottom orifice, and a distributor connected to said aperture perimeter and substantially covering said aperture region and protruding into said container;

wherein said distributor, when water is sprayed upwardly toward said container by a nozzle positioned beneath said distributor, deflects a portion of said sprayed water back toward said nozzle so as to clean said nozzle.

6. The non-liquid chemical delivery system of claim 5, said dispenser cap comprising a single molded piece of plastic that includes said mesh substrate, said distributor, and a lip positioned on the aperture perimeter of said mesh substrate for coupling said mesh substrate to said bottom of said container.

7. The non-liquid chemical delivery system of claim 6, said distributor comprising a water spray blocking member mounted on risers that connect said water spray blocking member to said aperture perimeter so that said risers and said water spray blocking member protrude into said container, said water spray blocking member creating a multi-directional flow of water when water impinges thereon from said nozzle such that a portion of said water migrates between said risers and into said container.

8. The non-liquid chemical delivery system of claim 6, said distributor comprising a dome shaped member mounted on risers that connect said dome shaped member to said aperture perimeter so that said risers and said dome shaped member protrude into said container, said dome shaped member creating a multi-directional flow of water when water impinges thereon from said nozzle such that a portion of said water migrates between said risers and into said container.

9. The non-liquid chemical delivery system of claim 6, said distributor comprising a cone shaped member mounted on risers that connect said cone shaped member to said aperture perimeter so that said risers and said cone shaped member protrude into said container, said cone shaped member creating a multi-directional flow of water when water impinges thereon from said nozzle such that a portion of said water migrates between said risers and into said container.

* * * * *